United States Patent Office 3,035,080
Patented May 15, 1962

3,035,080
NEW ESTER-AMIDES OF PHOSPHORIC AND THIO-PHOSPHORIC ACID AND A PROCESS FOR PREPARING THE SAME
Herbert Arnold and Friedrich Bourseaux, Bielefeld, and Norbert Brock, Wadersloh, Germany, assignors to Asta-Werke Aktiengesellschaft Chemische Fabrik, Brackwede, Germany
No Drawing. Filed July 16, 1958, Ser. No. 748,804
Claims priority, application Germany July 24, 1957
10 Claims. (Cl. 260—461)

The present invention relates to new ester-amides of phosphoric and thiophosphoric acid and to a process for preparing the same.

More particularly the invention relates to the new compounds of the general formula

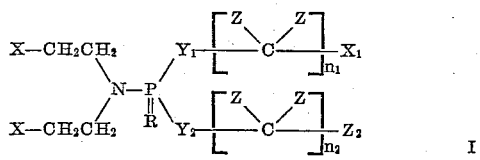

wherein X represents a halogen atom, preferably chlorine; R stands for a member of the group consisting of oxygen and sulfur; $Y_1$ and $Y_2$ each represents a member of the group consisting of the bivalent radicals —O—, —NH— and —NZ—; $X_1$ stands for a member of the group consisting of hydrogen and the halogen atoms; $X_2$ stands for a member of the group consisting of hydrogen, the halogen atoms, the hydroxyl and amino group and the amino groups substituted by the radical Z; Z represents a member of the group consisting of hydrogen, the alkyl radicals with 1–6 carbon atoms and the said alkyl radicals being substituted by hydroxy, etherified hydroxy (such as methoxy or ethoxy), carboxyl, carboxyalkyl (such as carboxymethyl or carboxyethyl), amino and substituted amino (such as mono- or di-methyl- or -ethyl-amino) groups; and $n_1$ and $n_2$ each represents an integer from 1–8.

The alkyl radicals with 1–6 carbon atoms may have a straight or branched chain.

The products which are preferred according to the invention are those of the general formula

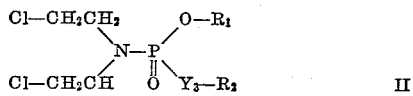

wherein $R_1$ represents an alkyl radical having 2–4 carbon atoms and either unsubstituted or substituted by chlorine; $R_2$ represents an alkyl radical having 2–4 carbon atoms and either unsubstituted or substituted by chlorine or hydroxyl; and $Y_3$ represents one of the bivalent groups —O—, —NH— and —NR$_2$—.

The products of the general Formula I can be produced from a compound of the general formula.

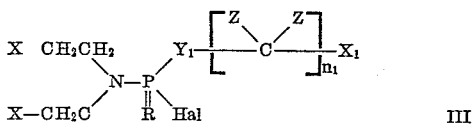

wherein R, X, $X_1$, $Y_1$, Z and $n_1$ have the same meaning as in Formula I and Hal stands for halogen, preferably for chlorine, by reaction with a compound of the general formula

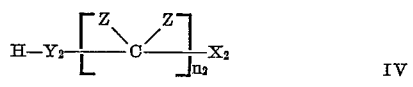

wherein $Y_2$, Z, $n_2$ and $X_2$ have the same meaning as in Formula I.

The reaction is carried out in the presence of acid-binding agents such as triethylamine and preferably in organic solvents, such as benzene and dioxane, which are inert with respect to the reactants. The reaction generally takes place even at room temperature.[1] The reaction mixture is preferably stirred during the reaction and, after the reaction has taken place, left to stand for some hours, for example overnight, at room temperature. The compounds of the general Formula I have a strongly inhibiting effect on the growth of various animal tumours. Particularly noteworthy is that the margin between toxic and curative doses is very wide with these compounds. They can thus be used in the therapy of malignant tumours in human medicine.

For characterisation of the new compounds, the complete relationship between the curative and toxic effects of doses on the same type of animal was determined. It is possible to derive from this relationship all the data necessary for judgment and evaluation purposes, for example the therapeutic index $$\frac{DL5}{DC95}$$

For the pharmacological characterisation of the curative effective component, there were employed the Yoshida ascites sarcoma, the Walker-256-carcinoma, the Jensen sarcoma and the DS-carcinosarcoma of Druckrey, which chemotherapeutically is particularly resistant. Only the ultimate curing of animals having tumours was considered as the reliable criterion of the curative action. The cure was only considered as certain if no recidivation and no metastases could be observed for at least 90 days after the rate used as test animals had been treated.

If the prior known cancer chemotherapeutics are tested under the experimental conditions set forth, the result is that the therapeutic index $$\frac{DL5}{DC95}$$

of practically all known cytostatistics is more or less below 1. The therapeutic range of these substances is consequently very small.

The substances obtainable in accordance with the invention are characterized under analogous experimental conditions by a positive therapeutic index $$\frac{DL5}{DC95}$$

This is something quite exceptional which could scarcely be achieved hitherto in practice. By way of example, the therapeutic index for some of the substances described in the following examples is set out in the following table. The Yoshida ascites sarcoma was used in these tests. Analogous data which quantitatively are only slightly different were also obtained using other types of tumours.

TABLE

| Substance: | Therapeutic index |
|---|---|
| Example 4 | about 4 |
| Example 6 | about 4 |
| Example 7 | about 8 |
| Example 8 | about 3 |
| Example 9 | about 3 |
| Example 12 | about 30 |
| Example 17 | about 3 |

The invention is illustrated by the following examples. The starting materials corresponding to the general Formula III are obtainable by known methods. A method yielding good results uses N,N-bis-(β-chloroethyl)-phosphoric acid amide dihalogenides as starting materials. In order to prepare for instance N,N-bis-(β-chloroethyl)-O-

[1] or at 40–50° C.

ethyl-phosphoric acid ester amide chloride one may proceed as follows: A solution of 9.2 g. of absolute ethyl alcohol and 20.2 g. of triethylamine in 50 cc. of dioxane is slowly added dropwise and while stirring well to a solution of 51.8 g. of N,N-bis-(β-chloroethyl)-phosphoric acid amide dichloride. After a time the triethylamine hydrochloride starts to separate out. For completing the reaction, the solution is stirred for 6–7 hours and left to stand overnight at room temperature. It is sepaarted from the triethylamine hydrochloride, filtered through carbon and concentrated by evaporation in a water-jet vacuum at 35–40° C. For removing residual triethylamine hydrochloride, the residue is taken up with a large quantity of ether, again filtered through carbon and again concentrated by evaporation in a water-jet vacuum. It is then evacuated under high vacuum at 50° C. for 1 hour in order to remove volatile fractions. The substances obtained in this way can be used in most cases in their crude state for the further processing.

In suitable cases, especially in cases where both halogen atoms of the N,N-bis-(β-chloroethyl)-phosphoric acid amide dihalogenides are to be replaced by the same radical it is possible to avoid the isolation of the intermediate products and to prepare the desired final products in a one-phase-process. Several of the examples hereafter following describe such one-phase-processes.

*Example 1*

N,N-bis-(β-chloroethyl)-O,O',-diethyl-phosphoric acid diester amide.

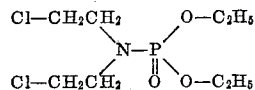

A solution of 25.9 g. of N,N-bis-(β-chloroethyl)-phosphoric acid amide dichloride and 20.2 g. of triethylamine in 200 cc. of absolute ethanol is heated for 3 hours at boiling point. The excess ethanol is then extracted in a water-jet vacuum and the residue submitted to extraction several times with absolute dioxane. The dioxane solution is concentrated by evaporation in a water-jet vacuum and the oily residue is taken up in absolute ether, filtered through carbon and again concentrated in water-jet vacuum. The remainder of the volatile fraction is removed by evacuation under high vacuum at about 50° C. The result is a colourless, mobile water-insoluble oil.

*Example 2*

N,N - bis - (β - chloroethyl) - O - ethyl - O' - (δ - chlorobutyl)-phosphoric acid diester amide.

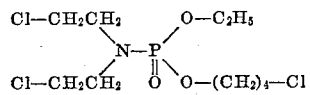

A solution of 20 g. of N,N-bis-(β-chloroethyl)-O-ethylphosphoric acid amide ester chloride, 8.1 g. of tetramethylene chlorohydrin and 7.5 g. of triethylamine in 100 cc. of absolute benzene is heated for 5–6 hours at the boiling point. After the substantially quantitative precipitation of the triethylamine hydrochloride, the solution is separated from the latter. The filtrate is concentrated in water-jet vacuum and the oily residue is taken up in ether, filtered through carbon and again concentrated after standing for some time in a refrigerator. Thereafter, it is evacuated under high vacuum at 60° C. for 1–2 hours to remove volatile fractions. The result is a brownish mobile oil which cannot be distilled and which is insoluble in water.

*Example 3*

N,N,O - tris - (β - chloroethyl) - O' - (β - hydroxyethyl)-phosphoric acid diester amide.

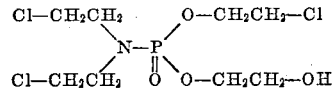

A solution of 25 g. of N,N,O-tris-(β-chloroethyl)-phosphoric acid amide ester chloride, 5.1 g. of absolute ethylene glycol and 9 g. of triethylamine in 100 cc. of absolute dioxane is heated for 5–6 hours in a water bath. After the substantially quantitative deposition of the triethylamine hydrochloride, the remaining substance is worked up as indicated in Example 2. The result is a colourless, mobile oil, which is insoluble in water.

*Example 4*

N,N-bis-(β-chloroethyl)-O,O'-bis-(δ-chlorobutyl)-phosphoric acid diester amide.

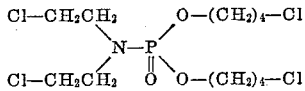

A solution of 43.4 g. of tetramethylene chlorohydrin and 40.4 g. of triethylamine in 100 cc. of absolute dioxane is added dropwise at a temperature up to 30° C., with thorough stirring, to a solution of 51.8 g. of N,N-bis-(β-chloroethyl)-phosphoric acid amide dichloride in 70 cc. of absolute dioxane. After the substantially quantitative deposition of the triethylamine hydrochloride, the solvent is removed in water-jet vacuum and the residual oil is shaken thoroughly several times with large quantities of ether. The ether extract is filtered through carbon and evaporated in water-jet vacuum. The result is a yellowish oil which is insoluble in water.

*Example 5*

N,N - bis - (β - chloroethyl) - N' - (β - hydroxyethyl)-O-methyl-phosphoric acid ester diamide.

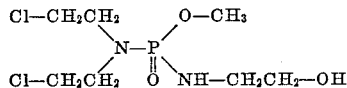

A solution of 5.2 g. of aminoethanol and 10.2 g. of triethylamine in 50 cc. of absolute dioxane is slowly added dropwise while stirring well to a solution of 22.5 g. of N,N-bis-(β-chloroethyl)-O-methyl-phosphoric acid amide chloride in 100 cc. of absolute dioxane. Stirring is continued for several hours and then the liquid is filtered off with suction from the precipitated triethylamine hydrochloride. The filtrate is filtered through carbon and concentrated by evaporation in water-jet vacuum at 40° C. The residue is dissolved in a little alcohol. Copious amounts of ether are added and the solution is left overnight in a refrigerator. It is then again filtered through carbon, the ether is evaporated and the residual volatile fractions are removed under high vacuum at 55° C. The result is an orange, fairly viscous oil, which is soluble in water.

*Example 6*

N,N - bis-(β - chloroethyl) - N' - (β - hydroxyethyl)-O-ethyl-phosphoric acid ester diamide.

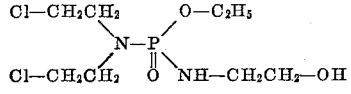

A solution of 6.1 g. aminoethanol and 10.2 g. of triethylamine in 50 cc. of absolute dioxane is slowly added dropwise while stirring at a temperature of 25–30° C. to a solution of 26.7 g. of N,N-bis-(β-chloroethyl)-O-ethyl-phosphcric acid ester amide chloride in 100 cc. of absolute dioxane. The reaction mixture is stirred for some hours. The working up is carried out as indicated in Example 6. The result is a yellowish, readily mobile oil, being difficultly soluble in water.

*Example 7*

N,N - bis - (β - chloroethyl) - N' - (β - hydroxyethyl)-O-propyl-phosphoric acid ester diamide.

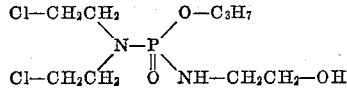

A solution of 5.2 g. of aminoethanol and 10 g. of triethylamine in 50 cc. of absolute dioxane is added dropwise at a temperature of 25–30° C. while stirring to a solution of 24 g. of N,N-bis-(β-chloroethyl)-O-propyl-phosphoric acid ester amide chloride. The reaction mixture is stirred well for several hours. The working up is carried out as indicated in Example 6. The result is a yellow, viscous oil, insoluble in water.

*Example 8*

N,N - bis - (β - chloroethyl) - O,O' - bis - (β - chloroethyl)-phosphoric acid diester amide.

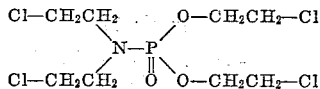

A solution of 25.9 g. of N,N-bis-(β-chloroethyl)-phosphoric acid amide dichloride, 16 g. of ethylene chlorohydrine and 20.2 g. of triethylamine in 150 cc. of absolute dioxane is heated in a water bath until the precipitation of the triethylamine hydrochloride is completed. The reaction mixture is worked up as indicated in Example 5. The result is a brownish oil being insoluble in water.

*Example 9*

N,N - bis - (β - chloroethyl) - O - ethyl - N' - δ - hydroxybutyl)-phosphoric acid ester diamide.

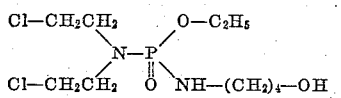

A solution of 8.1 g. of 1.4-aminobutanol and 10 g. of triethylamine in 50 cc. of absolute dioxane is added drop by drop to a solution of 24 g. of N,N-bis-(β-chloroethyl)-O-ethyl-phosphoric acid ester amide chloride while stirring well. Stirring is continued for several hours. The mixture is worked up according to Example 6. The result is an orange coloured rather viscous oil, being insoluble in water.

*Example 10*

N,N - bis - (β - chloroethyl) - N' - (γ - hydroxypropyl)-O-ethyl-phosphoric acid ester diamide.

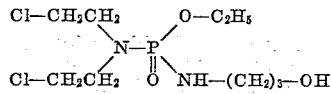

A solution of 6.2 g. of 1.3-aminopropanol and 10 g. of triethylamine in 50 cc. of absolute dioxane is slowly added dropwise while stirring at a temperature up to 35° C. to a solution of 24 g. of N,N-bis-(β-chloroethyl)-O-ethyl-phosphoric acid amide chloride in 100 cc. of absolute dioxane. After the substantially quantitative precipitation of the triethylamine hydrochloride, working up is carried out as indicated in Example 5, the result being a yellow, somewhat viscous oil which is insoluble in water.

*Example 11*

N,N - bis - (β - chloroethyl) - O - (n - propyl) - N' - (γ-hydroxypropyl)-phosphoric acid ester diamide.

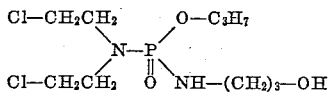

A solution of 6.4 g. of 1.3 aminopropanol and 10 g. of triethylamine in 50 cc. of absolute dioxane is slowly added dropwise while stirring well at a temperature of 30° C. to a solution of 24 g. of N,N-bis-(β-chloroethyl)-O-(n-propyl)-phosphoric acid amide chloride. After the precipitation of the triethylamine hydrochloride, working up is carried out as indicated in Example 5, the result being a yellow viscous oil.

*Example 12*

N,N,O - tris - (β - chloroethyl) - N' - (γ - hydroxy - n-propyl)-phosphoric acid ester diamide.

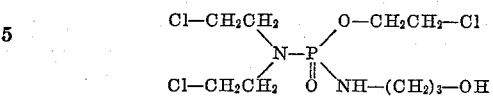

A solution of 8 g. of ethylene chlorohydrine and 10.2 g. of triethylamine in 50 cc. of absolute dioxane is slowly added dropwise to a solution of 25.9 g. of N,N-bis-(β-chloroethyl)-phosphoric acid amide dichloride in 100 cc. of absolute dioxane. The mixture is then heated for 2 hours at 60° C. After cooling, a solution of 7.5 g. of 1.3-propanolamine and 10.2 g. of triethylamine in 50 cc. of absolute dioxane is added dropwise while stirring well and at a temperature up to 30° C. The mixture is left to stand for another 12 hours and then it is worked up as indicated in Example 5. The result is a yellowish rather viscous oil which is insoluble in water.

*Example 13*

N,N,O - tris - (β - chloroethyl) - N' - (δ - hydroxybutyl)-phosphoric acid ester diamide.

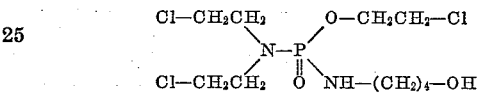

A solution of 7.3 g. of 1.4-aminobutanol and 9 g. of triethylamine in 40 cc. of absolute dioxane is added dropwise while stirring well to a solution of 25 g. of N,N,O-tris-(β-chloroethyl)-phosphoric acid amide chloride in 80 cc. of absolute dioxane. The mixture is thereafter heated for another 2–3 hours and working up is carried out as indicated in Example 5, the result being a yellow oil.

*Example 14*

N,N,O - tris - (β - chloroethyl) - N' - (β - aminoethyl)-phosphoric acid ester diamide.

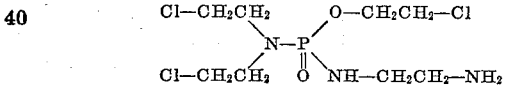

A solution of 6.3 g. of ethylene diamine hydrate and 9 g. of triethylamine in 50 cc. of absolute dioxane is slowly added dropwise while stirring well and at a temperature of 27° C. to a solution of 24.3 g. of N,N,O-tris-(β-chloroethyl)-phosphoric acid amide in 80 cc. of absolute dioxane. Working up takes place as indicated in Example 5, and the result is a fairly viscous oil.

*Example 15*

N,N,N'-tris-(β-chloroethyl) - O - (chlorobutyl) - phosphoric acid ester diamide

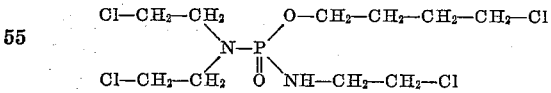

A solution of 16.5 g. of N,N-bis-(β-chloroethyl)-O-(δ-chlorobutyl)-phosphoric acid amide chloride in 100 cc. of absolute benzene is added dropwise while stirring well and at a temperature up to 30° C. to a solution of 5.7 g. of β-chloroethylamine hydrochloride and 10.1 g. of triethylamine in 50 cc. of dimethyl formamide. After the mixture has been allowed to stand for 24 hours, the substance is separated from the precipitated triethylamine hydrochloride and concentrated by evaporation in waterjet vacuum. The working up yields a viscous water-insoluble oil.

*Example 16*

N,N - bis - (β - chloroethyl) - N' - (δ - hydroxybutyl)-O(δ-chlorobutyl)-phosphoric acid ester diamide.

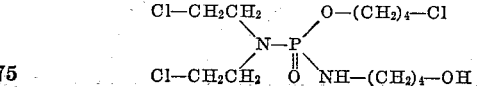

A solution of 4.5 g. of 1.4-aminobutanol and 5.5 g. of triethylamine in 50 cc. of absolute dioxane is added dropwise and while stirring well to a solution of 16.5 g. of N,N - bis - (β - chloroethyl) - O - (δ - chlorobutyl)-phosphoric acid amide chloride in 100 cc. of absolute benzene. Working up as indicated in Example 5 yields a yellow viscous oil.

*Example 17*

N,N',O-penta-(β-chloroethyl)-phosphoric acid ester diamide.

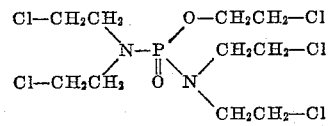

200 g. of bis-(β-chloroethyl)-amine hydrochloride are dissolved in water, ice is added thereto and then the liquid is covered with ether. The mixture is then made clearly alkaline with dilute sodium hydroxide solution. After several stages of ether extraction, the ether extracts are dried over Na₂SO₄. The solution produced in this way is added dropwise at —10 to —5° C. to a solution of 100 g. of phosphoric acid-(β-chloroethyl ester)-dichloride and 80 g. of triethylamine in 100 cc. of chloroform. After the working up and purification, a faintly yellow oil is obtained which cannot be distilled.

*Example 18*

N,N,O - tris-(β-chloroethyl)-O'-(δ-sorbitol)-phosphoric acid diester amide.

A solution of 15.3 g. of D-sorbitol and 8.4 g. of triethylamine in 80 cc. of dimethylformamide is added to a solution of 25 g. of N,N-tris-(β-chloroethyl)-phosphoric acid amide chloride in 50 cc. of absolute benzene and the combined solutions heated for 5–6 hours at 50° C. After the substantially quantitative precipitation and separation of triethylamine hydrochloride, the filtrate is concentrated in water-jet vacuum. The residue is extracted several times with acetone and ether and the combined solutions are filtered through carbon, concentrated in water-jet vacuum and thereafter evacuated for 1 hour under high vacuum at 80° C. The result is a yellowish viscous syrup.

*Example 19*

N,N - bis-(β-chloroethyl)-O,O'-bis(δ-chlorobutyl)-thiophosphoric acid diester amide.

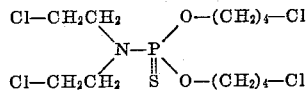

A solution of 15 g. of N,N-bis-(β-chloroethyl)-thiophosphoric acid amide dichloride, 11.8 g. of tetramethylene chlorohydrin and 11 g. of triethylamine is heated to boiling point in 150 cc. of absolute dioxane until there is quantitative separation of triethylamine hydrochloride. After working up and purifying, there is obtained a slightly coloured mobile liquid.

*Example 20*

N,N,O - tris-(β-chloroethyl)-N'-(γ-hydroxy-γ-methyl)-propylphosphoric acid ester diamide.

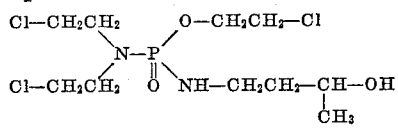

A solution of 8 g. of ethylene chlorhydrin and 10.2 g. of triethylamine in 50 cc. of absolute dioxane is added dropwise to a solution of 25.9 g. of N,N-bis-(β-chloroethyl)-phosphoric acid amide dichloride in 100 cc. of absolute dioxane. After all the first-mentioned solution has been added, the combined solutions are heater for another 2 hours. After cooling, a solution of 8.9 g. of 1-amino-butanol-3 is added dropwise at a temperature of 30–35° C. while stirring well, and stirring is continued for a number of hours. The solution is separated from the triethylamine hydrochloride, filtered through carbon and concentrated by evaporation in vacuo. The residue is taken up with a small quantity of absolute alcohol and copious quantities of ether are added. After standing for 12 hours in a refrigerator, it is again filtered through carbon and concentrated by evaporation in water-jet vacuum. The volatile fractions are then removed by evacuation for 2 hours under high vacuum at 50° C. The result is a colourless and fairly readily mobile oil.

*Example 21*

N,N,O - tris - (β - chloroethyl)-N'-(γ-hydroxypropyl)-thiophosphoric acid ester diamide.

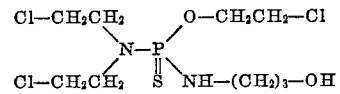

A solution of 27.5 g. of N,N,-bis-(β-chloroethyl)-thiophosphoric acid amide dichloride, 8 g. of ethylene chlorhydrin and 10.2 g. of triethylamine in 70 cc. of absolute dioxane is heated for 5–6 hours in an oil bath at 80–90° C. After cooling, a solution of 7.5 g. of 1.3-propanolamine and 10.2 g. of triethylamine in 50 cc. of absolute dioxane is added dropwise at a temperature of 25° C. and while stirring well. Stirring is continued for some time and the substance is separated from the precipitated triethylamine hydrochloride. The filtrate is filtered through carbon, concentrated by evaporation in water-jet vacuum and the residue introduced into a large quantity of ether. After standing for 12 hours in a refrigerator, the resulting mixture is filtered through carbon, concentrated in vacuo and thereafter evacuated for 2 hours under high vacuum at 50–55° C. The result is a yellow and fairly mobile oil.

*Example 22*

N,N,O - tris-(β-chloroethyl)-N'-(γ-hydroxy-γ-methyl)-propyl-thiophosphoric acid ester diamide.

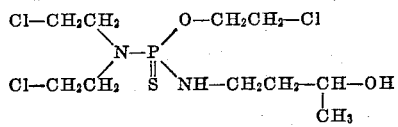

A solution of 27.5 g. of N,N,-bis-(chloroethyl)-thiophosphoric acid amide dichloride, 8 g. of ethylene chlorhydrin and 10.2 g. of triethylamine in 70 cc. of absolute dioxane is heated for 5–6 hours in an oil bath at 80–90° C. After cooling, a solution of 8.9 g. of 1-aminobutanol-3 and 10.2 g. of triethylamine in 50 cc. of absolute dioxane is added dropwise at a temperature of 25° C. Working up is carried out in the same way as indicated in Example 20, and the result is a yellow viscous oil.

What we claim is:

1. As a new product N,N,O-tris-(β-chloroethyl)-N'-(γ-hydroxy-n-propyl)-phosphoric acid ester diamide.

2. As a new product N,N-bis-(β-chloroethyl-N'-(β-hydroxyethyl)-O-propyl-phosphoric acid ester diamide.

3. As a new product N,N-bis-(β-chloroethyl)-O,O'-bis-(δ-chlorobutyl)-phosphoric acid diester amide.

4. As a new product N,N-bis-(β-chloroethyl)-N'-(β-hydroxyethyl)-O-ethyl-phosphoric acid ester diamide.

5. The process which comprises reacting a compound of the following general formula

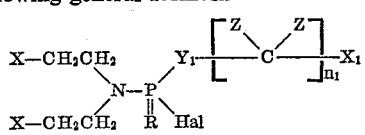

wherein X represents a halogen atom; R stands for a member selected from the group consisting of oxygen and sulfur; Y₁ represents a member selected from the group consisting of the bivalent radicals —O—, —NH— and —NZ—; Z represents a member selected from the group consisting of hydrogen, the alkyl radicals with 1-6 carbon atoms and the said alkyl radicals being substituted by a member selected from the group consisting of the hydroxyl group, the etherified hydroxyl group, the carboxyl group, the carboxyalkyl group, the amino group, and substituted amino groups; $n_1$ represents an integer from 1-8; $X_1$ stands for a member selected from the group consisting of hydrogen and the halogen atoms; and Hal stands for a halogen atom, with a compound of the general formula

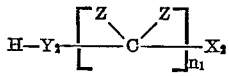

wherein $Y_2$ represents a member selected from the group consisting of the bivalent radicals —O—, —NH— and —NZ—; Z has the same meaning as above; $n_2$ stands for an integer from 1-8; and $X_2$ stands for a member selected from the group consisting of hydrogen, the halogen atoms, the hydroxyl groups, the amino group, and the amino group substituted by the radical Z, in the presence of an inert diluent and an acid-binding agent.

6. The compounds of the formula

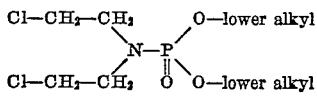

7. The compounds of the formula

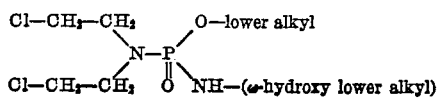

8. The compounds of the formula

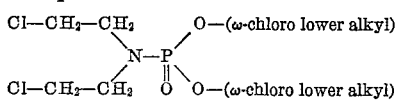

9. The compounds of the formula

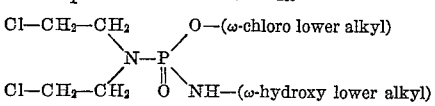

10. The new compounds of the following general formula

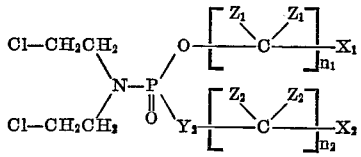

wherein $X_1$ stands for a member selected from the group consisting of hydrogen and the halogen atoms; $Z_1$ represents a member selected from the group consisting of hydrogen and the alkyl radicals with 1-6 carbon atoms; $n_1$ represents an integer from 1-8; $X_2$ represents a member selected from the group consisting of hydrogen, chlorine, the hydroxyl group and the amino group; $Y_2$ represents a member selected from the group consisting of the bivalent radicals —O— and —NH—; $Z_2$ represents a member selected from the group consisting of hydrogen and the methyl radical and $n_2$ represents an integer from 2-4.

No references cited.